Oct. 13, 1959  E. P. JACOBS  2,908,779
TIRE DEFLATION INDICATOR
Filed June 25, 1958
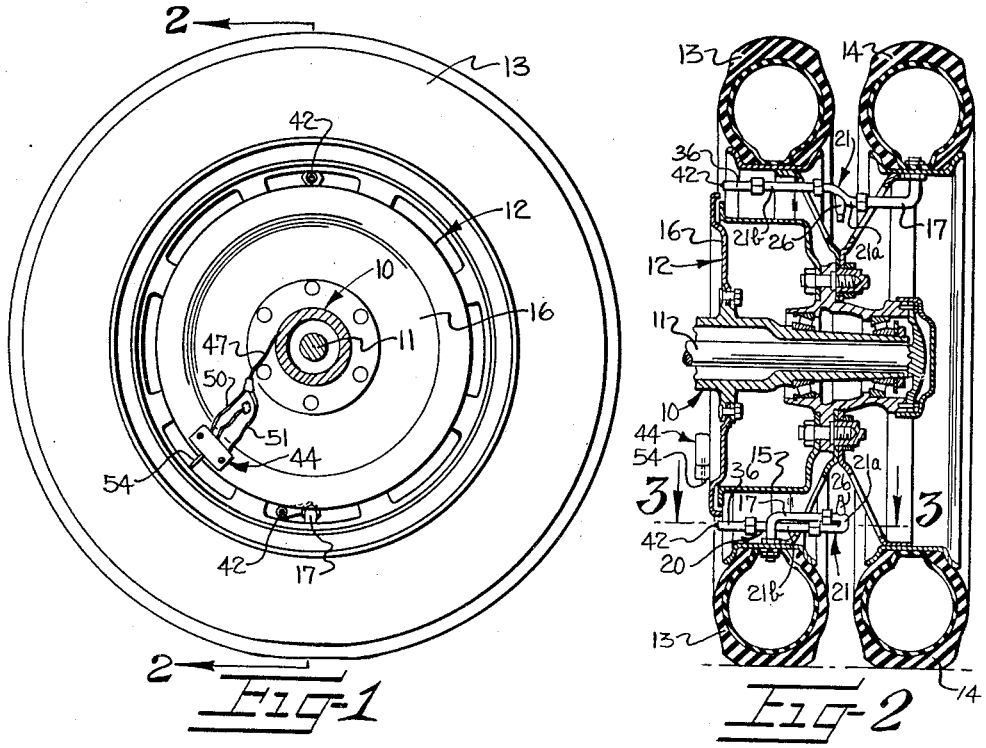
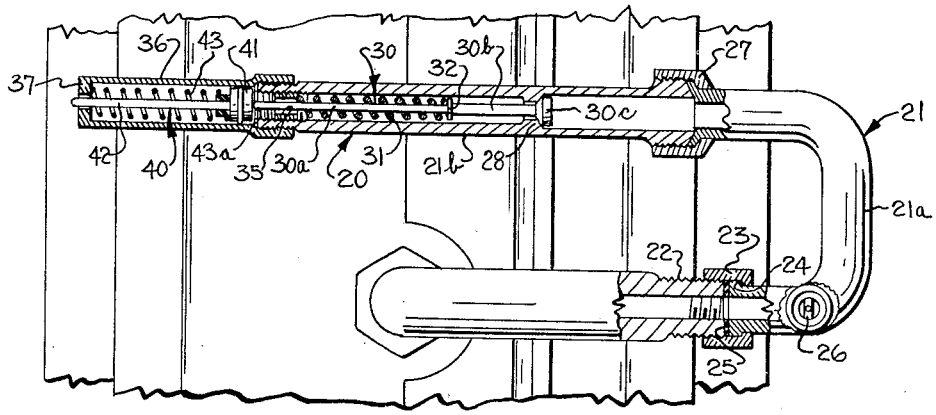
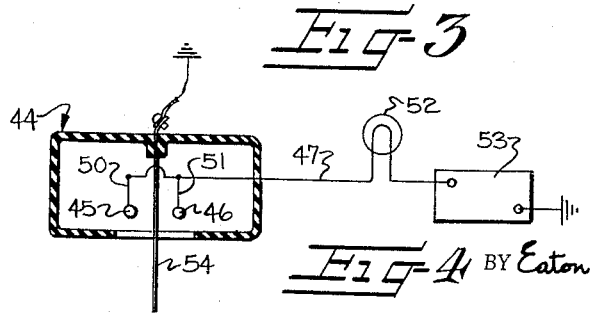
EDDIE P. JACOBS
INVENTOR
BY Eaton, Bell, Hunt + Seltzer
ATTORNEYS

United States Patent Office 2,908,779
Patented Oct. 13, 1959

2,908,779

TIRE DEFLATION INDICATOR

Eddie P. Jacobs, High Point, N.C.

Application June 25, 1958, Serial No. 744,430

6 Claims. (Cl. 200—61.25)

This invention relates to improved means for indicating the deflation of a pneumatic tire for vehicles. More particularly, the present invention is directed to a pressure responsive switch adapted to be attached to the valve stem of a tire for completing an electric warning circuit when the pressure within the tire drops below a predetermined amount.

Pneumatic tires used on a vehicle are inflated with sufficient pressure to permit successful operation of the vehicle. If one tire is partially deflated, the reduced pressure within the tire may unbalance the vehicle to such an extent that the control of the same is seriously affected, thus making it extremely difficult for the driver to hold the vehicle in the road. Low air pressure in a tire is also damaging in another respect in that continued operation of an under-inflated tire will adversely affect the wearing qualities of the tire and may ruin or badly damage the tire.

It is an object of this invention to provide a warning signal to the driver of a vehicle whenever the pressure within a tire on the vehicle has fallen below a predetermined amount.

Another object of this invention is to provide a pressure responsive switch which may be attached to the conventional valve stem of a tire, said switch having contact means movable outwardly by the pressure within the tire to complete an electric warning circuit whenever the pressure within the tire has fallen below a predetermined amount.

It is another object of this invention to provide a pressure responsive switch for the valve stem of each pneumatic tire of a vehicle, each switch including a spring loaded valve operable to block leakage of air from the tire through the valve stem when the pressure within the tire is equal to or in excess of a predetermined amount, but movable away from closed position whenever the air pressure within the tire falls below said predetermined amount to permit the air within the tire to pass through the valve stem and force a contact member outwardly for intermittently completing an electric warning circuit during rotation of the tire.

Some of the objects of the invention having been stated, other objects will appear as the description proceeds, when taken in connection with the accompanying drawings, in which—

Figure 1 is a side elevation of the inner surface of a vehicle wheel showing the improved tire deflation indicator mounted thereon;

Figure 2 is a vertical sectional view taken along line 2—2 in Figure 1 and showing the improved tire deflation indicator mounted on a vehicle wheel having dual tires;

Figure 3 is a greatly enlarged fragmentary view partially in section, taken substantially along line 3—3 in Figure 2 and showing the improved pressure responsive switch attached to the valve stem of the tire; and Figure 4 is a diagrammatic view of the electric warning circuit associated with the improved pressure responsive switch.

Referring more specifically to the drawings, the numeral 10 indicates part of a vehicle chassis, such as the axle housing, within which is received the rotating axle 11. A wheel assembly 12 adapted to receive tires 13 and 14 is rotatably mounted about the axle housing 10 and secured to the axle 11. It will be understood that the wheel assembly 12 may comprise either a single or dual wheel assembly, a dual wheel assembly being described herein for purposes of illustration. The wheel assembly 12 includes the usual brake drum 15, while the axle housing 10 has the brake drum dust plate 16 secured thereto. Tires 13 and 14 are each provided with the usual valve stem 17.

An improved pressure responsive switch 20, embodying the present invention, is adapted to be attached to the free end of each valve stem 17. The pressure responsive switch 20 includes a tubular stem 21 which may be connected to the valve stem 17 in any suitable manner. As shown in Figure 3, the outer end of the valve stem 17 is conventionally threaded as at 22 for reception of an internally threaded cap member 23 adapted to be seated about an annular shoulder 24 formed on the adjacent end of the tubular stem 21. A suitable gasket 25 of resilient material, such as rubber, is preferably sandwiched between the opposed end surfaces of the valve stem 17 and the tubular stem 21 of the pressure responsive switch 20 to prevent the leakage of air pressure from the tire through the joint formed between the valve stem 17 and the pressure responsive switch 20. When the pressure responsive switch 20 is formed as a separate unit to be attached to the valve stem 17, as shown, the conventional needle valve is removed from the valve stem 17. In order to facilitate the inflation of the tire by the addition of air pressure thereto through the valve stem 17, a valve fitting 26 may be provided on the tubular stem 21 of the pressure responsive switch 20, although as hereinafter described a separate valve means within the tubular stem 21 is designed to take the place of the needle valve which has been removed from the valve stem 17.

Although the tubular stem 21 of the pressure responsive switch 20 is shown in the shape of a J in Figure 3, it is to be understood that this shape is shown for purposes of illustration only, since it is contemplated that the tubular stem 21 may assume a variety of shapes without departing from the spirit of the invention. When formed in the shape of a J as shown, the tubular stem 21 is divided into two segments 21a, 21b to permit the tubular stem 21 to be equipped with valve means as subsequently described. A suitable means, such as an encircling threaded nut 27, is provided to couple the tubular stem segments 21a, 21b together. The tubular stem segment 21b includes the valve means therein which comprises a radially inwardly extending annular shoulder or valve seat 28 integral with the stem segment 21b and an elongated plunger 30 carried within the stem segment 21b.

The plunger 30 consists of integral plunger sections having progressively increasing diameters, these being a rod section 30a at one end and having a relatively small diameter, an intermediate shaft section 30b, and an enlarged valve member 30c at the other end. The diameter of the intermediate shaft section 30b, although greater than that of the rod section 30a, is less than the diameter of the opening through the valve seat 28 to allow the shaft section 30b to be loosely received within the opening through the valve seat 28. The enlarged valve member 30c of the plunger 30 is adapted to be held against the annular shoulder or valve seat 28 formed in the tubular stem 21. A coiled compression spring 31 having a comparatively large compressive strength, as for example 20 pounds per square inch, encircles the plunger 30, the coiled spring 31 being positioned on the opposite side of the annular shoulder or valve seat 28 with respect to the enlarged valve member 30c on one end of the plunger 30. One end of the coiled spring 31 is seated against a washer 32 removably mounted about the plunger 30 at the juncture between the rod section 30a and the shaft section 30b. Thus, it will be seen that the washer 32 is held in abutment against a shoulder formed by the juncture between rod section 30a and shaft section 30b of the plunger 30 by the coiled spring 31. The other end of the coiled spring 31 is seated against a nut 35 threaded within the outer end of the tubular stem segment 21b.

The outer end of the tubular stem segment 21b is externally threaded to receive an extension stem or cylinder 36. The free or outer end of the cylinder 36 terminates in an end wall 37 having a central aperture therethrough. Thus, the cylinder 36 may be said to constitute an extension of the tubular stem 21, being disposed outwardly with respect to the valve means 28, 30 in the tubular stem segment 21b and housing switch contact means 40 as subsequently described. The switch contact means 40 is disposed within the cylinder 36 and takes the form of a piston 41 having an elongated pin 42 protruding from one face thereof. The piston 41 is adapted to be disposed adjacent the outer end of the elongated plunger 30 and the pin 42 is adapted to protrude through the aperture formed in the end wall 37 of the cylinder 36. A coiled spring 43 having a comparatively weak compressive force, as for example from one to two pounds pressure per square inch, encircles the contact means 40 and is seated at its opposite ends against the piston 41 and the end wall 37 of the cylinder 36. A suitable means, such as a split retainer ring 43a, is provided in the cylinder 36 at the end thereof adjacent the stem segment 21b to serve as a stop for the piston 41, thereby preventing the piston 41 from being urged against the plunger 30.

The operation of the pressure responsive switch 20 with respect to a tire and its valve stem 17 to which the switch 20 is attached will now be described. Assuming that the amount of air pressure within the tire is maintained at a safe level, for example 32 pounds per square inch, it will be apparent that this air pressure communicates with the interior of the tubular stem 21 and impinges against the end surface of the enlarged valve member 30c formed on the elongated plunger 30. Since the coiled spring 31 has a compressive strength of only twenty pounds per square inch, it cannot withstand the pressure existing within the tire which is effective to move the plunger 30 until the valve member 30c thereon is seated against the annular shoulder or valve seat 28 formed in the tubular stem 21, as viewed in Figure 3. The elongated plunger 30 and its valve member 30c are accordingly maintained in closed position with the valve member 30c in engagement with the valve seat 28 at all times when the pressure within the tire is twenty pounds per square inch or greater. The valve member 30c cooperates with the valve seat 28 to block the leakage of air pressure from the tire through the tubular stem 21 of the pressure responsive switch 20 into the atmosphere. It will also be understood that the coiled spring 31 is in a compressed state whenever the valve member 30c is in closed position against the valve seat 28.

If, for some reason, a slow leak should develop in the tire, resulting in a loss of air pressure therefrom, this lowered pressure condition will also be present against the end of the enlarged valve member 30c. Should the pressure within the tire drop below twenty pounds per square inch, the coiled spring 31 being in a compressed state is then effective to move the elongated plunger 30 from left to right, as viewed in Figure 3, thereby moving the enlarged valve member 30c thereon to open position. Once the valve member 30c has been moved away from the valve seat 28 formed in the tubular stem 21, the air pressure from the tire is permitted to flow through the tubular stem 21 past the valve member 30c and the valve seat 28.

Now, it will be observed that the air pressure is permitted to flow into the cylinder 36, where it acts against the opposed face of the piston 41 mounted therein. As previously indicated, the coiled spring 43 mounted between the piston 41 and the end wall 37 of the cylinder 36 is of comparatively weak compressive strength and offers little resistance to the movement of the piston 41 by the pressure escaping from the tire through the tubular stem 21. Thus, the piston 41 is moved from right to left, as viewed in Figure 3, thereby causing the pin 42 associated therewith to be moved outwardly of the cylinder 36 through the aperture in end wall 37.

Thus, it will be understood that upon movement of the plunger 30 from closed position to open position, such movement being caused by a loss of pressure within the tire, the lowered pressure within the tire is transmitted through the tubular stem 21 against the piston 41 mounted in the cylinder 36 to move the same for extending the elongated pin 42 outwardly of the cylinder 36 to complete an electric warning circuit in a manner to be presently described.

The electrical warning circuit, as shown diagrammatically in Figure 4, comprises a receptacle or container 44 adapted to be suitably mounted on the brake drum dust plate 16 carried by the axle housing 10. The receptacle 44 houses a pair of electrical contacts or terminals 45, 46. The contacts 45, 46 are connected to an electrical conductor or wire 47 by suitable connecting wires 50, 51, respectively. The wire 47 leads from the contacts or terminals 45, 46 through an electric light or bulb 52 and is connected at its opposite end to a suitable source of electric power, such as an electric storage battery 53, which is grounded. The receptacle 44 also houses a leaf spring 54 of electrically conductive material. One end of the leaf spring 54 is connected to a suitable ground, while the opposite end protrudes outwardly from the receptacle 44 into proximity with the end wall 37 of the cylinder 36. It will be observed that the leaf spring 54 extends between the pair of contacts or terminals 45, 46, being spaced equidistant from each terminal. Since the receptacle 44 housing the leaf spring 54 is mounted on the brake drum dust plate 16 which remains stationary, it will be apparent that the pressure responsive switch 20 which is mounted on the valve stem 17 of each tire will rotate with respect thereto whenever the vehicle is in motion, either forwardly or rearwardly.

Assuming that the pressure in one of the tires 13, 14 has dropped below 20 pounds per square inch to permit the valve member 30c of the pressure responsive switch 20 to be moved to open position, accordingly, the contact means 40 mounted in the cylinder 36 will be moved from retracted to extended position wherein the pin 42 protrudes outwardly of the cylinder 36 through the aperture in its end wall 37. As will be observed in Figure 1, when this condition attains, the pin 42 will be placed in overlapping relationship with respect to the leaf spring 54 carried by the receptacle 44 of the electric warning system. As the deflated tire completes one revolution, the extended pin 42 will strike against the leaf spring 54, thereby deflecting it against either one of the electric contacts or terminals 45, 46. The direction of movement of the vehicle will determine which of the two contacts or terminals 45, 46 will be engaged by the deflected leaf spring 54. Upon contact being established between the deflected leaf spring 54 and one of the electrical contacts or terminals 45, 46, the electrical warning circuit is completed by grounding this terminal through the leaf spring 54. Accordingly, the electric light or bulb 52 in the circuit is energized causing the same to light. In operation, each complete revolution of the deflated tire will energize the electric bulb 52 thereby causing it to flicker on and off. The electric light or bulb 52 can be located on the instrument board of the vehicle to permit the driver of the same to be readily appraised by the flickering of the light 52 that one of the tires is under-inflated. The flickering of the light 52 is caused because the electric warning circuit is not energized continuously but only for a fraction of a second during each complete revolution of the under-inflated tire.

It will be apparent that the valve means formed by the enlarged valve member 30c of the plunger 30 and the valve seat 28 can be utilized in much the same manner as the needle valve (not shown) which has been removed from the valve stem 17 in inflating the tire with air pressure. In accomplishing this purpose, the cylinder 36 is disengaged from the stem segment 21b by unthreading the same. A source of air pressure is operatively connected to the stem segment 21b in such a manner as to force the plunger 30 inwardly to unseat the valve member 30c from the valve seat 28, whereupon air pressure from the source is transmitted through the unblocked tubular stem 21 and the valve stem 17 into the tire. The split ring 43a retains the switch contact means 40, which includes piston 41 and pin 42, against dislodgement from the cylinder 36 by the spring 43 when the cylinder 36 is removed from the stem segment 21b. As hereinbefore described, the valve fitting 26 on the tubular stem 21 provides an alternative means of inflating the tire in which case the removal of cylinder 36 from stem segment 21b would not be necessary.

Although shown and described as a two-piece element, it is contemplated that the tubular stem 21 may comprise the stem segment 21b only in installations permitting this segment to be directly connected to the valve stem 17. Moreover, it is within the spirit of this invention to utilize the stem segment 21b as the valve stem 17 itself. In the latter instance, the stem segment 21b would replace the valve stem 17 with the conventional needle valve therein on the tire which would then be inflated in the manner previously described.

Thus, it will be seen that there has been disclosed an improved tire deflation indicator having relatively few working parts and therefore being unlikely to create repair problems. The improved pressure responsive switch 20 is operable to complete an electric warning circuit by the reduced pressure condition within the tire itself.

In the drawings and specification there has been set forth a preferred embodiment of the invention and although specific terms are employed, they are used in a generic and descriptive sense only and not for purposes of limitation, the scope of the invention being defined in the claims.

I claim:

1. A pressure responsive switch for attachment to the valve stem of a pneumatic tire to indicate the deflation thereof, said switch comprising a tubular stem, valve means in said tubular stem, said valve means including a valve member normally maintained in closed position to block the passage of air pressure through said tubular stem, means for moving said valve member to open position in response to a predetermined pressure drop in the tire, and contact means disposed outwardly in said tubular stem with respect to said valve means and movable outwardly when said valve member is moved to open position by the predetermined pressure drop in the tire to complete an electric warning circuit.

2. A pressure responsive switch for attachment to the valve stem of a pneumatic tire to indicate the deflation thereof, said switch comprising a tubular stem, valve means in said tubular stem, said valve means including a valve member normally maintained in closed position to block the passage of air pressure through said tubular stem, means for moving said valve member to open position in response to a predetermined pressure drop in the tire, and a piston disposed outwardly in said tubular stem with respect to said valve means and having an elongated pin protruding from the end thereof remote from said valve means, said piston and pin being movable outwardly when said valve member is moved to open position by the predetermined pressure drop in the tire, and the outer end of said pin being adapted to complete an electric warning circuit when in extended position.

3. A pressure responsive switch for attachment to the valve stem of a pneumatic tire to indicate the deflation thereof, said switch comprising a tubular stem, valve means in said tubular stem, said valve means including a valve member normally maintained in closed position to block the passage of air pressure through said tubular stem, first resilient spring means for moving said valve member to open position in response to a predetermined pressure drop in the tire, contact means disposed outwardly in said tubular stem with respect to said valve means, second resilient spring means comparatively weak in contrast to said first resilient spring means and seated against said contact means and the outer end of said tubular stem at its opposite ends, said contact means being movable outwardly into extended position and compressing said second resilient spring means when said valve member is moved to open position by the predetermined pressure drop in the tire to complete an electric warning circuit, and said second resilient spring means moving said contact means inwardly into retracted position when sufficient air pressure has been introduced into the tire to restore said valve member to closed position.

4. In a signalling system for indicating deflation of a pneumatic tire for a vehicle wheel, a tubular valve stem extending from said tire, a movable plunger carried within said stem, said plunger having an enlarged valve member on one end thereof, means in said valve stem against which said enlarged valve member is normally seated to prevent escape of air pressure from the tire through said stem, resilient means cooperating with said plunger to urge said valve member away from seating engagement with said means in the valve stem when the air pressure in the tire falls below a predetermined amount, and contact means slidably disposed in said stem adjacent the other end of said plunger, whereby upon the lowering of the air pressure in the tire below a predetermined amount, said valve member is unseated from the means in said valve stem by said resilient means and air pressure from the tire is passed through the valve stem to move said contact means outwardly for completing an electric warning circuit.

5. In a signalling system for indicating deflation of a pneumatic tire for a vehicle wheel, a tubular valve stem extending from said tire, a movable plunger carried within said stem, said plunger having an enlarged valve member on one end thereof, an inwardly extending annular shoulder in said valve stem against which said enlarged valve member is normally seated to prevent escape of air pressure from the tire through said stem, resilient means cooperating with said plunger to urge said valve member away from seating engagement with said annular shoulder when the air pressure in the tire falls below a predetermined amount, a piston slidably disposed in said stem adjacent the other end of said plunger, said piston being fixedly mounted on one end of an elongated pin, whereby upon the lowering of the air pressure in the tire below a predetermined amount, said valve member is unseated from said annular shoulder by said resilient means and air pressure from the tire is passed through the valve stem to move said piston and pin outwardly, the other end of said pin being adapted to complete an electric warning circuit when said pin is in extended position.

6. In a signalling system for indicating deflation of a pneumatic tire for a vehicle wheel, a tubular valve stem extending from the inner periphery of said tire, a movable plunger carried within said stem, said plunger having an enlarged valve member on one end thereof, means in said valve stem against which said enlarged valve member is normally seated to prevent escape of air pressure from the tire through said stem, resilient means cooperating with said plunger to urge said valve member away from seating engagement with said means in the valve stem when the air pressure in the tire falls below a predetermined amount, a leaf spring extending radially into proximity with the inner periphery of said tire, said tire being rotatable with respect to said leaf spring, and contact means slidably disposed in said stem adjacent the other end of said plunger for movement outwardly into extended position by air pressure from the tire upon the air pressure in the tire being lowered sufficiently to cause said valve member to be unseated from the means in said valve stem by said resilient means, a portion of said leaf spring overlapping the outer end of said contact means when in extended position, whereby the outer end of said contact means when extended will engage said leaf spring once during each complete revolution of the tire to deflect said leaf spring intermittently for periodically completing an electric warning circuit.

References Cited in the file of this patent

UNITED STATES PATENTS

| | | |
|---|---|---|
| 2,445,959 | Luper | July 27, 1948 |
| 2,669,617 | Sletten et al. | Feb. 16, 1954 |
| 2,710,391 | Trinca | June 7, 1955 |